United States Patent
Kozitsky et al.

(10) Patent No.: US 9,002,066 B2
(45) Date of Patent: Apr. 7, 2015

(54) METHODS, SYSTEMS AND PROCESSOR-READABLE MEDIA FOR DESIGNING A LICENSE PLATE OVERLAY DECAL HAVING INFRARED ANNOTATION MARKS

(71) Applicant: Xerox Corporation, Norwalk, CT (US)

(72) Inventors: Vladimir Kozitsky, Rochester, NY (US); Peter Paul, Webster, NY (US); Aaron Michael Burry, Ontario, NY (US)

(73) Assignee: Xerox Corporation, Norwalk, CT (US)

( * ) Notice: Subject to any disclaimer, the term of this patent is extended or adjusted under 35 U.S.C. 154(b) by 131 days.

(21) Appl. No.: 13/887,541

(22) Filed: May 6, 2013

(65) Prior Publication Data

US 2014/0328518 A1     Nov. 6, 2014

(51) Int. Cl.
*G06K 9/00* (2006.01)
*G08G 1/01* (2006.01)
*B60Q 1/56* (2006.01)

(52) U.S. Cl.
CPC .................................. *G06K 9/00624* (2013.01)

(58) Field of Classification Search
CPC .......................................................... G06K 9/00
USPC .................... 382/105; 362/497; 340/933, 937
See application file for complete search history.

(56) References Cited

U.S. PATENT DOCUMENTS

| | | | | |
|---|---|---|---|---|
| 6,473,517 | B1 * | 10/2002 | Tyan et al. | ..... 382/105 |
| 6,982,654 | B2 * | 1/2006 | Rau et al. | ..... 340/937 |
| 7,825,829 | B2 * | 11/2010 | Madsen | ..... 340/937 |
| 8,009,870 | B2 | 8/2011 | Simon | |
| 2009/0202105 | A1 | 8/2009 | Castro Abrantes et al. | |
| 2012/0263352 | A1 | 10/2012 | Fan et al. | |
| 2012/0269398 | A1 | 10/2012 | Fan et al. | |
| 2013/0028481 | A1 | 1/2013 | Wu | |
| 2013/0088597 | A1 | 4/2013 | Kadoch et al. | |

\* cited by examiner

*Primary Examiner* — Abolfazl Tabatabai
(74) *Attorney, Agent, or Firm* — Kermit D. Lopez; Luis M. Ortiz; Ortiz & Lopez, PLLC

(57) ABSTRACT

Methods, systems and processor-readable media for providing a license plate overlay decal with an infrared readable annotation mark for an optical character recognition and segmentation. The annotation mark with respect to character image of a license plate can be designed by training an ALPR engine to improve automatic license plate recognition performance. A plate overlay decal can be rendered with the annotation mark and attached to a license plate. The annotation mark can also be directly placed on the license plate when the license plate is rendered. The annotation mark is visible when illuminated by an infrared light and the license plate appears normal in visible light. The annotation mark enables an ALPR imaging system to obtain more information for each character and utilize the information to improve conclusion accuracy.

20 Claims, 11 Drawing Sheets

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | 1181 | 0 | 0 | 0 | 0 | 0 | 0 | 0 | 1 | 0 | 0 | 1 | 1 | 16 | 0 | 0 |
| 1 | 0 | 1190 | 0 | 0 | 0 | 0 | 0 | 0 | 0 | 0 | 0 | 0 | 0 | 0 | 0 | 0 |
| 2 | 0 | 0 | 1198 | 0 | 0 | 0 | 0 | 0 | 0 | 0 | 0 | 0 | 0 | 0 | 0 | 0 |
| 3 | 0 | 2 | 0 | 1192 | 0 | 0 | 0 | 0 | 0 | 0 | 0 | 1 | 0 | 0 | 0 | 0 |
| 4 | 0 | 7 | 0 | 0 | 1179 | 0 | 0 | 1 | 0 | 0 | 8 | 0 | 0 | 0 | 0 | 0 |
| 5 | 0 | 1 | 0 | 0 | 0 | 1197 | 0 | 0 | 0 | 0 | 0 | 2 | 0 | 0 | 0 | 0 |
| 6 | 0 | 0 | 0 | 0 | 0 | 0 | 1194 | 0 | 0 | 2 | 0 | 0 | 0 | 0 | 0 | 0 |
| 7 | 0 | 0 | 0 | 0 | 0 | 0 | 0 | 1196 | 0 | 1 | 1 | 0 | 0 | 0 | 0 | 0 |
| 8 | 0 | 1 | 0 | 0 | 0 | 0 | 0 | 0 | 1184 | 0 | 0 | 15 | 0 | 0 | 0 | 0 |
| 9 | 0 | 0 | 0 | 0 | 0 | 0 | 2 | 4 | 0 | 1189 | 0 | 5 | 0 | 0 | 0 | 0 |
| A | 0 | 0 | 0 | 0 | 0 | 0 | 1 | 0 | 0 | 0 | 1197 | 0 | 0 | 0 | 0 | 0 |
| B | 0 | 0 | 0 | 0 | 0 | 0 | 0 | 0 | 2 | 0 | 0 | 1194 | 0 | 1 | 0 | 0 |
| C | 0 | 0 | 0 | 0 | 0 | 0 | 0 | 0 | 0 | 0 | 0 | 0 | 1197 | 0 | 0 | 0 |
| D | 1 | 0 | 0 | 0 | 0 | 0 | 0 | 0 | 0 | 0 | 0 | 0 | 0 | 1199 | 0 | 0 |
| E | 0 | 0 | 0 | 0 | 0 | 0 | 1 | 0 | 0 | 0 | 0 | 0 | 0 | 0 | 1194 | 1 |
| F | 0 | 0 | 0 | 0 | 0 | 0 | 0 | 0 | 0 | 0 | 0 | 0 | 0 | 0 | 13 | 1184 |
| G | 9 | 0 | 0 | 0 | 0 | 0 | 0 | 1 | 0 | 0 | 0 | 1 | 0 | 0 | 0 | 0 |
| H | 0 | 2 | 0 | 0 | 1 | 0 | 0 | 0 | 0 | 0 | 0 | 1 | 0 | 0 | 0 | 0 |
| J | 0 | 0 | 0 | 0 | 0 | 0 | 0 | 1 | 0 | 0 | 0 | 0 | 0 | 0 | 0 | 0 |
| K | 0 | 0 | 0 | 0 | 0 | 0 | 1 | 0 | 0 | 0 | 1 | 0 | 0 | 0 | 0 | 0 |
| L | 0 | 2 | 0 | 0 | 0 | 0 | 0 | 0 | 0 | 0 | 0 | 0 | 0 | 0 | 1 | 0 |
| M | 0 | 0 | 0 | 0 | 0 | 0 | 0 | 0 | 0 | 0 | 1 | 0 | 0 | 0 | 0 | 0 |
| N | 0 | 0 | 0 | 0 | 0 | 0 | 0 | 0 | 0 | 0 | 0 | 0 | 0 | 0 | 0 | 0 |
| P | 0 | 0 | 0 | 0 | 0 | 0 | 0 | 0 | 0 | 0 | 0 | 0 | 1 | 0 | 0 | 0 |
| R | 0 | 0 | 0 | 0 | 0 | 0 | 0 | 0 | 0 | 0 | 0 | 0 | 0 | 0 | 0 | 0 |
| S | 0 | 0 | 0 | 3 | 0 | 2 | 0 | 0 | 0 | 0 | 0 | 0 | 0 | 0 | 0 | 0 |
| T | 0 | 8 | 0 | 0 | 0 | 0 | 0 | 3 | 0 | 0 | 0 | 0 | 0 | 0 | 0 | 2 |
| V | 0 | 0 | 0 | 0 | 0 | 0 | 4 | 0 | 0 | 0 | 0 | 0 | 0 | 0 | 0 | 0 |
| W | 0 | 1 | 0 | 0 | 0 | 0 | 0 | 0 | 0 | 0 | 0 | 0 | 0 | 0 | 0 | 0 |
| X | 0 | 0 | 0 | 0 | 0 | 0 | 0 | 1 | 0 | 0 | 0 | 0 | 0 | 0 | 0 | 0 |
| Y | 0 | 1 | 0 | 0 | 0 | 0 | 0 | 1 | 0 | 0 | 0 | 0 | 0 | 0 | 0 | 2 |
| Z | 0 | 0 | 3 | 0 | 1 | 0 | 5 | 0 | 0 | 0 | 0 | 0 | 0 | 0 | 0 | 1 |

FROM FIG. 1A

| | G | H | J | K | L | M | N | P | R | S | T | V | W | X | Y | Z |
|---|---|---|---|---|---|---|---|---|---|---|---|---|---|---|---|---|
| | 0 | 0 | 0 | 0 | 0 | 0 | 0 | 0 | 0 | 0 | 0 | 0 | 0 | 0 | 0 | 0 |
| | 0 | 0 | 1 | 0 | 1 | 0 | 0 | 0 | 0 | 0 | 7 | 1 | 0 | 0 | 0 | 0 |
| | 0 | 0 | 0 | 0 | 1 | 0 | 0 | 0 | 0 | 0 | 0 | 0 | 0 | 0 | 0 | 1 |
| | 0 | 0 | 4 | 0 | 0 | 0 | 0 | 0 | 0 | 1 | 0 | 0 | 0 | 0 | 0 | 0 |
| | 0 | 0 | 3 | 0 | 0 | 0 | 0 | 0 | 0 | 0 | 0 | 0 | 1 | 0 | 0 | 1 |
| | 0 | 0 | 0 | 0 | 0 | 0 | 0 | 0 | 0 | 0 | 0 | 0 | 0 | 0 | 0 | 0 |
| | 0 | 0 | 0 | 0 | 3 | 0 | 0 | 0 | 1 | 0 | 0 | 0 | 0 | 0 | 0 | 0 |
| | 0 | 0 | 0 | 0 | 0 | 0 | 0 | 0 | 0 | 0 | 0 | 0 | 0 | 0 | 0 | 2 |
| | 0 | 0 | 0 | 0 | 0 | 0 | 0 | 0 | 0 | 0 | 0 | 0 | 0 | 0 | 0 | 0 |
| | 0 | 0 | 0 | 0 | 0 | 0 | 0 | 0 | 0 | 0 | 0 | 0 | 0 | 0 | 0 | 0 |
| | 0 | 0 | 0 | 1 | 1 | 0 | 0 | 0 | 0 | 0 | 0 | 0 | 0 | 0 | 0 | 0 |
| | 0 | 0 | 0 | 0 | 1 | 0 | 0 | 1 | 1 | 0 | 0 | 0 | 0 | 0 | 0 | 0 |
| | 0 | 0 | 0 | 0 | 3 | 0 | 0 | 0 | 0 | 0 | 0 | 0 | 0 | 0 | 0 | 0 |
| | 0 | 0 | 0 | 0 | 0 | 0 | 0 | 0 | 0 | 0 | 0 | 0 | 0 | 0 | 0 | 0 |
| | 0 | 0 | 0 | 0 | 4 | 0 | 0 | 0 | 0 | 0 | 0 | 0 | 0 | 0 | 0 | 0 |
| | 0 | 0 | 0 | 0 | 0 | 0 | 0 | 3 | 0 | 0 | 0 | 0 | 0 | 0 | 0 | 0 |
| | 1188 | 0 | 0 | 0 | 0 | 0 | 0 | 0 | 0 | 0 | 0 | 0 | 0 | 0 | 0 | 0 |
| | 0 | 1194 | 0 | 0 | 0 | 1 | 0 | 0 | 0 | 0 | 0 | 1 | 0 | 0 | 0 | 0 |
| | 0 | 0 | 1199 | 0 | 0 | 0 | 0 | 0 | 0 | 0 | 0 | 0 | 0 | 0 | 0 | 0 |
| | 0 | 0 | 0 | 1198 | 0 | 0 | 0 | 0 | 0 | 0 | 0 | 0 | 0 | 0 | 0 | 0 |
| | 0 | 0 | 1 | 0 | 1196 | 0 | 0 | 0 | 0 | 0 | 0 | 0 | 0 | 0 | 0 | 0 |
| | 0 | 0 | 0 | 0 | 0 | 1198 | 1 | 0 | 0 | 0 | 0 | 0 | 0 | 0 | 0 | 0 |
| | 0 | 0 | 0 | 0 | 0 | 2 | 1196 | 0 | 0 | 0 | 0 | 2 | 0 | 0 | 0 | 0 |
| | 0 | 0 | 0 | 0 | 0 | 0 | 0 | 1198 | 1 | 0 | 0 | 0 | 0 | 0 | 0 | 0 |
| | 0 | 0 | 0 | 0 | 0 | 0 | 0 | 0 | 1199 | 0 | 0 | 0 | 0 | 0 | 0 | 0 |
| | 0 | 0 | 0 | 0 | 0 | 0 | 0 | 0 | 0 | 1195 | 0 | 0 | 0 | 0 | 0 | 0 |
| | 0 | 0 | 0 | 0 | 0 | 0 | 0 | 0 | 0 | 0 | 1187 | 0 | 0 | 0 | 0 | 0 |
| | 0 | 0 | 0 | 1 | 0 | 0 | 0 | 0 | 0 | 0 | 0 | 1190 | 0 | 0 | 5 | 0 |
| | 0 | 0 | 0 | 0 | 0 | 1 | 1 | 0 | 0 | 0 | 0 | 0 | 1196 | 0 | 1 | 0 |
| | 0 | 0 | 0 | 0 | 0 | 0 | 0 | 0 | 0 | 0 | 0 | 0 | 0 | 1199 | 0 | 0 |
| | 0 | 0 | 0 | 0 | 0 | 0 | 0 | 0 | 0 | 0 | 0 | 6 | 0 | 1 | 1189 | 0 |
| | 0 | 0 | 0 | 0 | 0 | 0 | 0 | 0 | 0 | 0 | 0 | 0 | 0 | 0 | 0 | 1190 |

FIG. 1B

METHODS, SYSTEMS AND PROCESSOR-READABLE MEDIA FOR DESIGNING A LICENSE PLATE OVERLAY DECAL HAVING INFRARED ANNOTATION MARKS

FIELD OF THE INVENTION

Embodiments are generally related to ALPR (Automatic License Plate Recognition) systems and methods. Embodiments are also related to image processing systems and methods. Embodiments are additionally related to license plate overlay decals.

BACKGROUND

ALPR (Automatic License Plate Recognition) system often functions as the core module of "intelligent" transportation infrastructure applications. License plate recognition can be employed to identify a vehicle by automatically reading a license plate utilizing an image processing and character recognition technology. A license plate recognition operation can be performed by locating the license plate in an image, segmenting the characters in the plate, and performing an OCR (Optical Character Recognition) operation with respect to the characters identified. Performance requirements for an ALPR engine are increasing over time driven by users' desire to reduce the number of recognition errors. One common source of errors is a close-character sibling error where certain characters look very similar to each other and in the presence of image noises, lead to incorrect classification by the ALPR engine. Examples include 8/B, 0/D, 2/Z, 5/S, etc. These most often occur on the letter-number boundary where numbers look like letters and vice versa. If 'O' or 'Q' is part of the OCR dictionary, then the confusion is typically between 'O', 'Q', and 'D'.

The OCR subsystem typically accepts individual character images as input and runs algorithms to classify the image as one of 32-36 (depending on jurisdiction) class labels such as A-Z and 0-9. FIGS. 1A and 1B illustrate the performance of a trained OCR engine when tested on an independent test set of characters. The font excludes 'IOQU' and thus there are only 32 possible classes. The ground truth labels are on the X-axis and the OCR conclusion is on the Y-axis. This matrix is called a "confusion matrix" since the characters that are confused with each other by the system become readily apparent.

For a perfect OCR engine, all off diagonal entries of the confusion matrix are zero. In FIGS. 1A and 1B, the two highlighted cases of OCR errors are 'B' incorrectly recognized as '8' ('B/8') 15 times and 'D' incorrectly recognized as '0' ('D/0') a total of 16 times. These are the expected dose character errors and the combinations change depending on the font. Of note is that the reverse combinations ('8/B') and ('0/D') have 2 and 1 errors respectfully indicating an asymmetry in confusion. Example character images extracted from the license plate images are shown in FIG. 2. Under poor imaging conditions, a blurry 'D' loses its top and bottom left corner distinctions and begins to look very similar to a '0'. Similarly, a blurry 'B' appears and is often incorrectly classified as an '8' whereas a blurry '0' or '8' still looks like '0' and an '8' are seldom misclassified. This explains the asymmetry in error rates observed in FIGS. 1A and 1B.

Majority of prior art methods utilize a higher resolution camera and increased illumination to distinguish between the close-characters siblings. Such methods require a large amount of expert hand tuning of camera setup parameters in order to achieve and maintain image quality levels enabling the ALPR engine to distinguish between the dose character siblings. License plate image signatures or image hashes have also been employed to augment the ALPR engine to improve the accuracy in license plates that have close-character siblings. Such approach requires manual plate recognition the first time each plate is checked by the system, an accurate automatic tight cropping of each license plate, access to a continuously updated central database, and a completely separate processing pipeline.

Another prior art approach places a barcode on the license plate in order to facilitate automatic reading of the plate, however, this approach occupies more valuable space on the plate and can lead to less visually appealing plates. Additionally, the barcode occupies significant space in order to make the barcode robust to the imaging noises present in the license plate reading systems and in order to carry its data payload which needs to include the plate character sequence and the state information. The bar code may also be visually unappealing depending on the technology.

FIG. 3 illustrates license plate image 180 illustrating character segmentation in determining the first and last characters as the spacing of characters is arbitrary. In FIG. 3, the plate cover to the left of the 'N' and to the right of the 'H' depicted by arrows 190 and 195 can be mistakenly segmented and classified as a '1' adding either one or two characters to the plate code. Additionally, the location of the logo can vary in size, location, and shape from state-to-state and across different plate designs are erroneously identified as a valid segmented character or by "attaching" itself to one of its neighboring characters in the segmentation results.

Based on the foregoing, it is believed that a need exists for an improved method and system for providing a license plate overlay decal with an infrared annotation mark for optical character recognition and segmentation, as will be described in greater detail herein.

SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for improved automatic license plate recognition methods, systems and processor-readable media.

It is another aspect of the disclosed embodiments to provide for methods, systems and processor-readable media for recognizing a license plate close-character sibling.

It is yet another aspect of the disclosed embodiments to provide for methods, systems and processor-readable media for providing a license plate overlay decal with an infrared annotation mark for optical character recognition and segmentation.

The aforementioned aspects and other objectives and advantages can now be achieved as described herein. Methods, systems and processor-readable media for providing a license plate overlay decal with an infrared readable annotation mark for an optical character recognition and segmentation are disclosed herein. The infrared readable annotation mark with respect to character image of a license plate can be designed by training an ALPR engine to improve automatic license plate recognition performance. A plate overlay decal can be rendered with the annotation mark and attached to a license plate. The annotation mark can also be directly placed on the license plate when the license plate is rendered. The annotation mark is visible when illuminated by an infrared light and the license plate appears normal in visible light. The infrared readable annotation mark enables an ALPR imaging system to obtain more information for each character and utilize the information to improve conclusion accuracy.

The ALPR engine can be trained and tested utilizing the character mages. The character images can be, for example, a labeled ground truth character image and/or a synthetic character image with modeled image noise imposed on the image. A confusion matrix can be generated in order to determine a dose character sibling. The IR-readable annotation mark with respect to the close-character siblings can be defined and the ALPR engine can be retrained utilizing the character images including the annotation mark. The annotation mark improves the accuracy of the ALPR engine so that the annotation mark fits in the ALPR training paradigm without special processing at run time.

The annotation mark enables the OCR engine to differentiate the dose character sibling even under poor imaging condition. The close-character sibling can be determined for a variety of font sets, plate designs, and image noises found under modeled conditions. The synthetic plate generation and synthetic noise generation process can be iterated to optimize the additional IR annotation mark resulting in very low off-diagonal terms in the confusion matrix. The noise can include blurring, geometric distortion, random noise, and common occlusions.

A boundary of the license plate character and a cut point can be determined utilizing the annotation mark such that each character can be coherently cropped out of the license plate image to improve the character segmentation accuracy. A logo on the license plate can be clearly identified utilizing the annotation marks to significantly improve the character segmentation accuracy. The presence of the overlay decal can be easily determined based on the presence or absence of the annotation mark. A warning can be issued by an electronic tolling system upon entry and/or exit of a toll road way if a user has not attached the overlay decal.

BRIEF DESCRIPTION OF THE FIGURES

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

FIGS. 1A and 1B illustrate a license plate recognition confusion matrix depicting optical character recognition errors;

DETAILED DESCRIPTION

Figure 2:
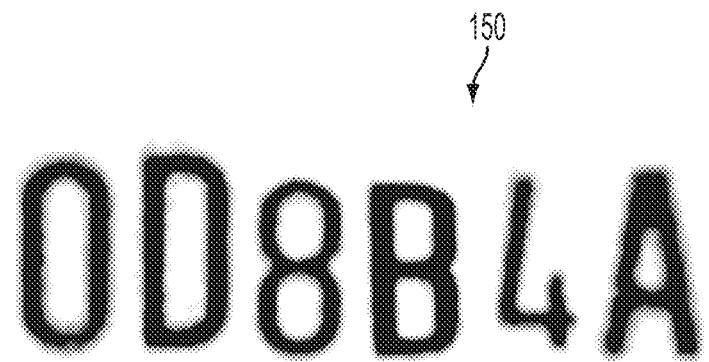
FIG. 2 illustrates similar character images extracted from a license plate image.
Figure 3:
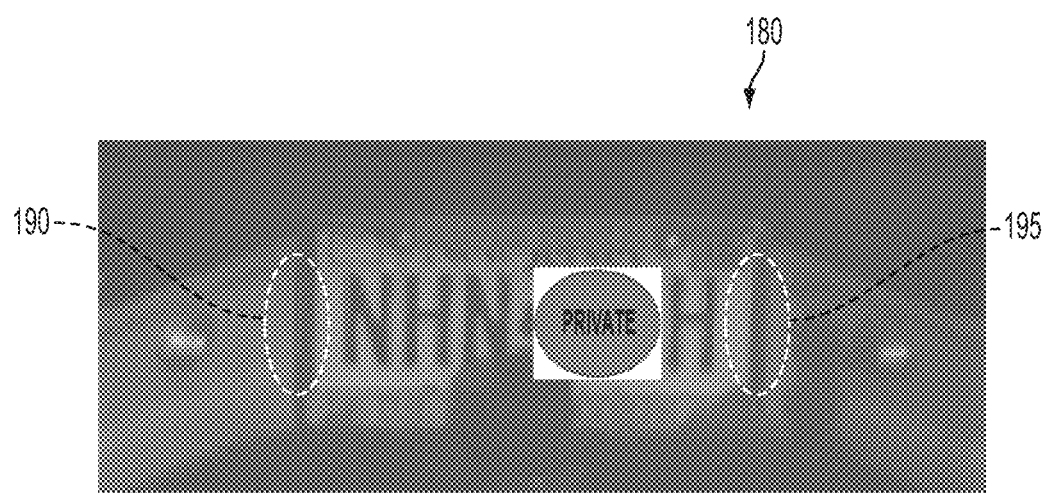
FIG. 3 illustrates a license plate image depicting character segmentation problem in determining first and last characters.

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the present invention can be embodied as a method, data processing system, or computer program product. Accordingly, the present invention may take the form of an entire hardware embodiment, an entire software embodiment or an embodiment combining software and hardware aspects all generally referred to herein as a "circuit" or "module." Furthermore, the present invention may take the form of a computer program product on a computer-usable storage medium having computer-usable program code embodied in the medium. Any suitable computer readable medium may be utilized including hard disks, USB Flash Drives, DVDs, CD-ROMs, optical storage devices, magnetic storage devices, etc.

Computer program code for carrying out operations of the present invention may be written in an object oriented programming language (e.g., Java, C++, etc.). The computer program code, however, for carrying out operations of the present invention may also be written in conventional procedural programming languages such as the "C" programming language or in a visually oriented programming environment such as, for example, Visual Basic.

The program code may execute entirely on the user's computer, partly on the user's computer, as a stand-alone software package, partly on the user's computer and partly on a remote computer or entirely on the remote computer. In the latter scenario, the remote computer may be connected to a user's computer through a local area network (LAN) or a wide area network (WAN), wireless data network e.g., WiFi, Wimax, 802.xx, and cellular network or the connection may be made to an external computer via most third party supported networks (e.g., through the Internet using an Internet Service Provider).

The embodiments are described at least in part herein with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of a general-purpose computer, special purpose computer, or other programmable data processing apparatus to produce a machine such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner such that the instructions stored in the computer-readable memory produce an article of manufacture including instruction means which implement the function/act specified in the block or blocks.

Figure 4:
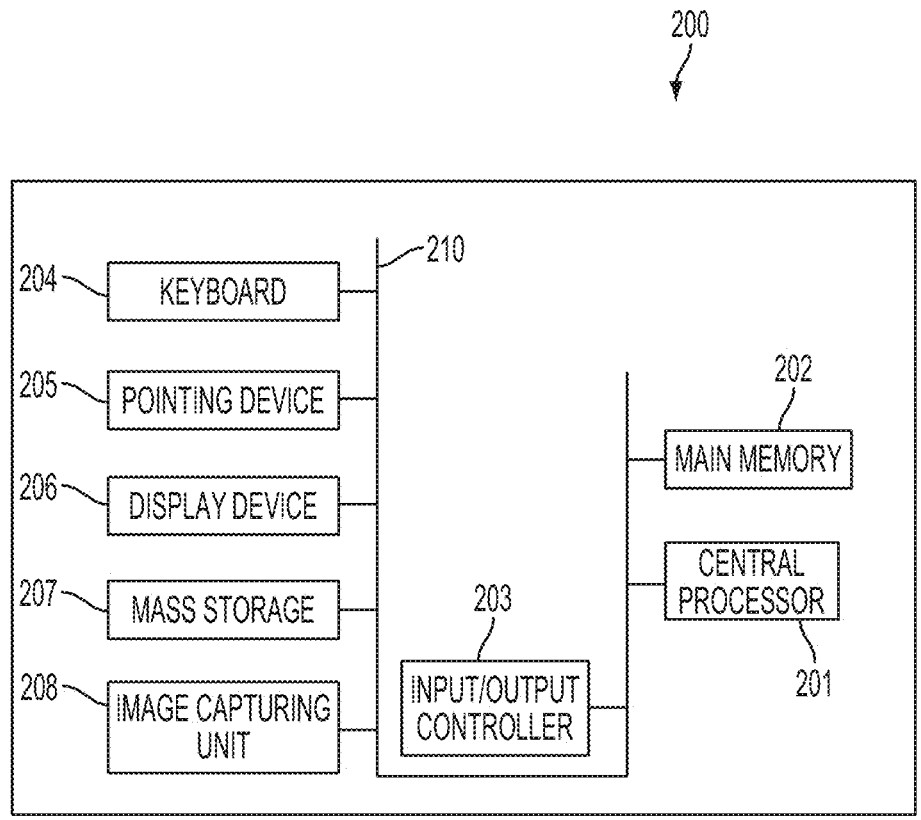
FIG. 4 illustrates a schematic view of a computer system, in accordance with the disclosed embodiments.
Figure 5:
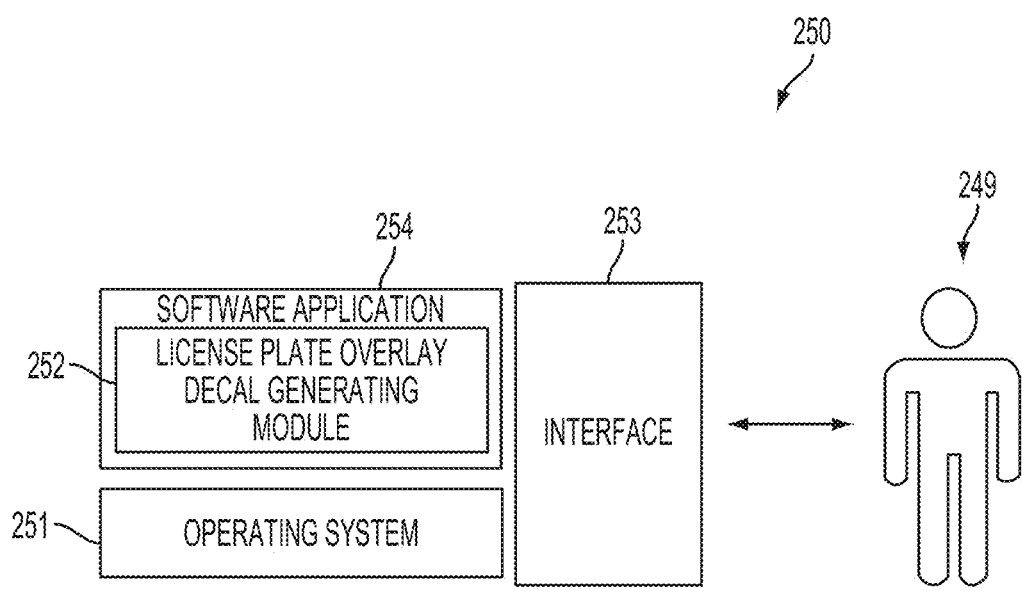
FIG. 5 illustrates a schematic view of a software system including a license plate overlay decal generating module, an operating system, and a user interface, in accordance with the disclosed embodiments.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks, FIGS. 4-5 are provided as exemplary diagrams of data-processing environments in which embodiments of the present invention may be implemented. It should be appreciated that FIGS. 4-5 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 4, the disclosed embodiments may be implemented in the context of a data-processing system 200 that includes, for example, a central processor 201, a main memory 202, an input/output controller 203, a keyboard 204, an input device 205 (e.g., a pointing device such as a mouse, track ball, and pen device, etc.), a display device 206, a mass storage 207 (e.g., a hard disk), an image capturing unit 208, and a USB (Universal Serial Bus) peripheral connection. As illustrated, the various components of data-processing system 200 can communicate electronically through a system bus 210 or similar architecture. The system bus 210 may be, for example, a subsystem that transfers data between, for example, computer components within data-processing system 200 or to and from other data-processing devices, components, computers, etc.

FIG. 5 illustrates a computer software system 250 for directing the operation of the data-processing system 200 depicted in FIG. 4. Software application 254, stored in main memory 202 and on mass storage 207, generally includes a kernel or operating system 251 and a shell or interface 253. One or more application programs, such as software application 254, may be "loaded" (i.e., transferred from mass storage 207 into the main memory 202) for execution by the data-processing system 200. The data-processing system 200 receives user commands and data from a user 249 through user interface 253; these inputs may then be acted upon by the data-processing system 200 in accordance with instructions from operating system module 252 and/or software application 254.

The following discussion is intended to provide a brief, general description of suitable computing environments in which the system and method may be implemented. Although not required, the disclosed embodiments will be described in the general context of computer-executable instructions such as program modules being executed by a single computer. In most instances, a "module" constitutes a software application.

Generally, program modules include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines; and an implementation, which is typically private (accessible only to that module) and which includes source code that actually implements the routines in the module. The term module may also simply refer to an application such as a computer program designed to assist in the performance of a specific task such as word processing, accounting, inventory management, etc.

The interface 253, which is preferably a graphical user interface (GUI), also serves to display results, whereupon the user may supply additional inputs or terminate the session. In an embodiment, operating system 251 and interface 253 can be implemented in the context of a "Windows" system. It can be appreciated, of course, that other types of systems are possible. For example, rather than a traditional "Windows" system, other operation systems such as, for example, Linux may also be employed with respect to operating system 251 and interface 253. The software application 254 can include a license plate overlay decal generating module 252 that includes an infrared readable annotation mark 370 to improve license plate recognition and segmentation by reducing confusion between similar characters (0 & D, 8 & B) and to improve character location and plate boundary. Software application 254, on the other hand, can include instructions such as the various operations described herein with respect to the various components and modules described herein such as, for example, the methods 700, 800, and 900 depicted in FIGS. 10, 11 and 12.

FIGS. 4-5 are thus intended as examples and not as architectural limitations of disclosed embodiments. Additionally, such embodiments are not limited to any particular application or computing or data-processing environment. Instead, those skilled in the art will appreciate that the disclosed approach may be advantageously applied to a variety of systems and application software. Moreover, the disclosed embodiments can be embodied on a variety of different computing platforms including Macintosh, UNIX, LINUX, and the like.

Figure 6:
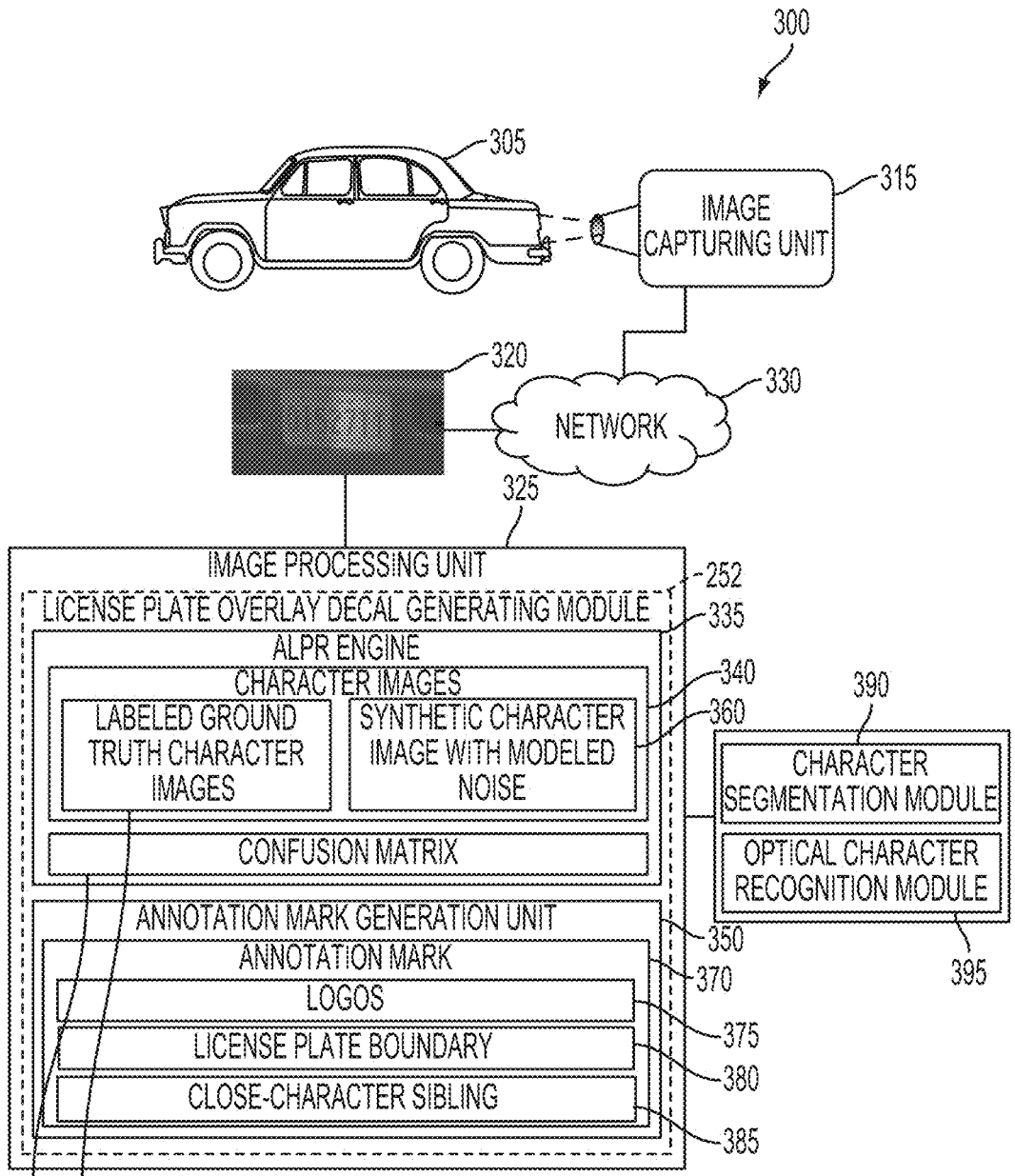
FIG. 6 illustrates a block diagram of a license plate overlay decal generating system, in accordance with the disclosed embodiments.

FIG. 6 illustrates a block diagram of a license plate overlay decal generating system 300 that includes the infrared readable annotation mark 370, in accordance with the disclosed embodiments. Note that in FIGS. 4-12, identical or similar blocks are generally indicated by identical reference numerals. The license plate overlay decal generating system 300 generally includes an image-capturing unit 315 (e.g., camera) for capturing an image of a vehicle 305 within an effective field of view. The image-capturing unit 315 provides an image of a license plate 320 mounted on the rear of the vehicle 305. Note that the image capturing unit 315 is capable of reading the license plate on the front of the vehicle 305 as well as the rear. The image capturing unit 315 can be operatively connected to an image processing unit 325 via a network 330.

Note that the network 330 may employ any network topology, transmission medium, or network protocol. The network 330 may include connections such as wire, wireless communication links, or fiber optic cables. Network 330 can also be an Internet representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, government, educational, and other computer systems that route data and messages.

The image capturing unit 315 can be operated as a handheld device and/or a vehicle-mounted device. Note that the image capturing unit 315 described in greater detail herein is analogous or similar to the image capturing unit 208 of the data-processing system 200, depicted in FIG. 4. The image capturing unit 315 may include built-in integrated functions such as image processing, data formatting, and data compression functions. Also, the unit includes imager-positioning, range-finding, and a flash bulb.

The license plate overlay decal generating system 300 further includes the image processing unit 325 to receive the captured digital image 320 from the image capturing unit 315 in order to process the image 320. The image processing unit 325 is preferably a small, handheld computer device or palm-top computer as depicted in FIG. 4 that provides portability and is adapted for easy mounting. The image processing unit 325 can be configured to include the license plate overlay decal generating module 252 to accurately recognize the license plate character of the vehicle 305.

The license plate overlay decal generating module 252 includes an ALPR engine 335 that can be trained and tested utilizing character images 340. The character images 340 can be, for example, a labeled ground truth character image 355 and/or a synthetic character image 360 with modeled image noise imposed on the image. The ALPR engine 335 generates a confusion matrix 345 in order to determine a close character sibling 385. The annotation mark generation unit 350 generates the IR-readable annotation mark 370 with respect to the close-character siblings 385.

The license plate overlay decal generation module 252 retrains the ALPR engine 335 utilizing the character images 340 including the annotation mark 370. The annotation mark 370 improves the accuracy of the ALPR engine 335 so that the annotation mark 370 fits in the ALPR training paradigm without special processing at run time. The annotation mark 370 determines a boundary 380 of the license plate character and a cut point such that each character can be coherently cropped out of the license plate image 320 to improve accuracy of the license plate character segmentation module 390. A logo 375 on the license plate 320 can be clearly identified utilizing the annotation marks 370 to significantly improve segmentation accuracy.

A high level of ALPR performance can be achieved by using the synthetic character image 360 with modeled image noise. Note that the noise can include blurring, geometric distortion, random noise, and common occlusions. In addition, the close-character siblings 385 can be determined for a variety of font set, plate design, and image noises found under modeled conditions. The license plate overlay decal generation module 252 can be iterated to optimize the additional IR annotation marks 370 resulting in very low off-diagonal terms in the confusion matrix 345 and highly accurate ALPR performance with respect to characters that can be confused with each other. The annotation mark 370 enables an OCR module 395 to differentiate the close character sibling 385 even under poor imaging condition.

The license plate overlay decal generation module 252 determines the presence of the overlay decal based on the presence or absence of the annotation mark 370. A warning can be issued by an electronic tolling system upon entry and/or exit of a toll road way if the user has not attached the overlay decal. The infrared readable annotation mark 370 reduce confusion between similar characters (0 & D, 8 & B) and improves the segmentation of a character and a plate boundary. A plate overlay decal can be rendered with the annotation mark 370 and attached to the license plate 320. The annotation mark 370 can also be directly placed on the license plate 320 when the license plate 320 is rendered. The annotation mark 370 is visible when illuminated by an infrared (IR) light and the license plates 320 appear normal in visible light. The annotation mark 370 in IR enables an ALPR imaging system to obtain more information for each character and utilize the information to improve conclusion accuracy.

Figure 7:
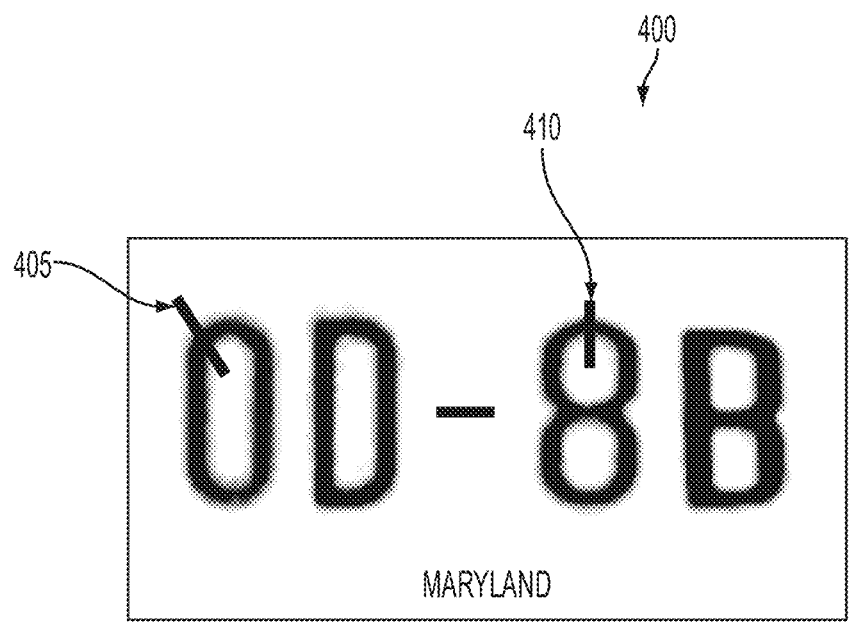
FIG. 7 illustrates similar character images with annotation mark extracted from a license plate image, in accordance with the disclosed embodiments.

FIG. 7 illustrates similar character images 400 with annotation marks 405 and 410 extracted from a license plate image, in accordance with the disclosed embodiments. The character images 400 with the annotation marks 405 and 410 can be captured when illuminated by infrared light. Note that the embodiments discussed herein should not be construed in any limited sense. It can be appreciated that such embodiments reveal details of the structure of a preferred form necessary for a better understanding of the invention and may be subject to change by skilled persons within the scope of the invention without departing from the concept thereof.

For example, the annotation mark 370 to differentiate between 0 and D is to change '0' into an upside down 'Q' and to differentiate 8 and B is to fill in the upper oval of the '8'. When viewed under visible light, the license plate characters look like FIG. 2 to enable police officers and users to recognize the plate and assist the ALPR image capturing unit 315 to be more effective in accurately recognizing the code. Note that the plate under visible light looks like it possesses standard characters, while the plate under infrared light has characters with the annotation marks 370 which aid the ALPR engine 335 to distinguish between close-character siblings 385.

Figure 8:
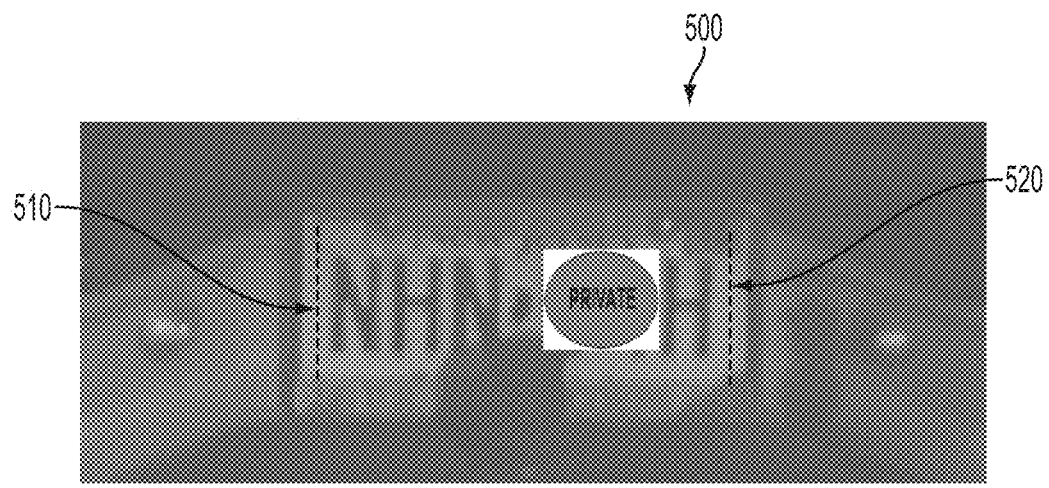
FIGS. 8-9 illustrate a license plate image with the annotation marks that can be employed to aid in the segmentation of individual characters, in accordance with the disclosed embodiments.
Figure 9:
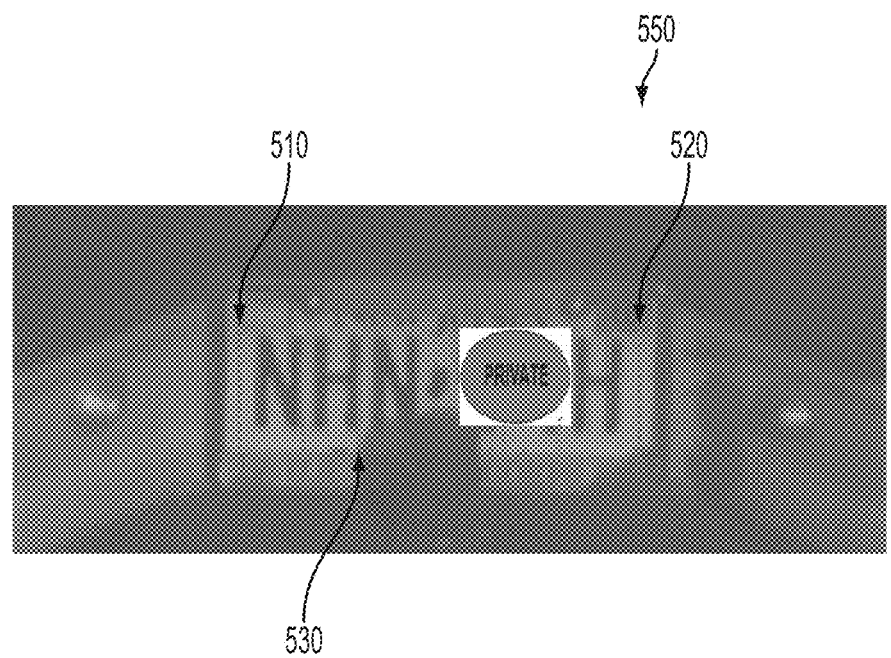

FIGS. 8-9 illustrate a license plate image 500 and 550 with the annotation marks 510, 520, and 530 that can be employed to aid in the segmentation of individual characters, in accordance with the disclosed embodiments. The IR readable annotation mark 510 and 520 can be added to the boundary of the license plates 500 and 550 to differentiate license plate boundaries as depicted in FIG. 8. The IR readable annotation mark 510, 520, and 530 can be added to the license plates 500 and 550 to aid in the segmentation of individual characters as depicted in FIG. 9. Similarly, the logo 375 on the license plate can be clearly identified utilizing the IR readable marks 370. The IR readable marks 370 clearly identify the locations of the logos 375 or other special symbols on the plate to significantly improve segmentation accuracy.

Figure 10:
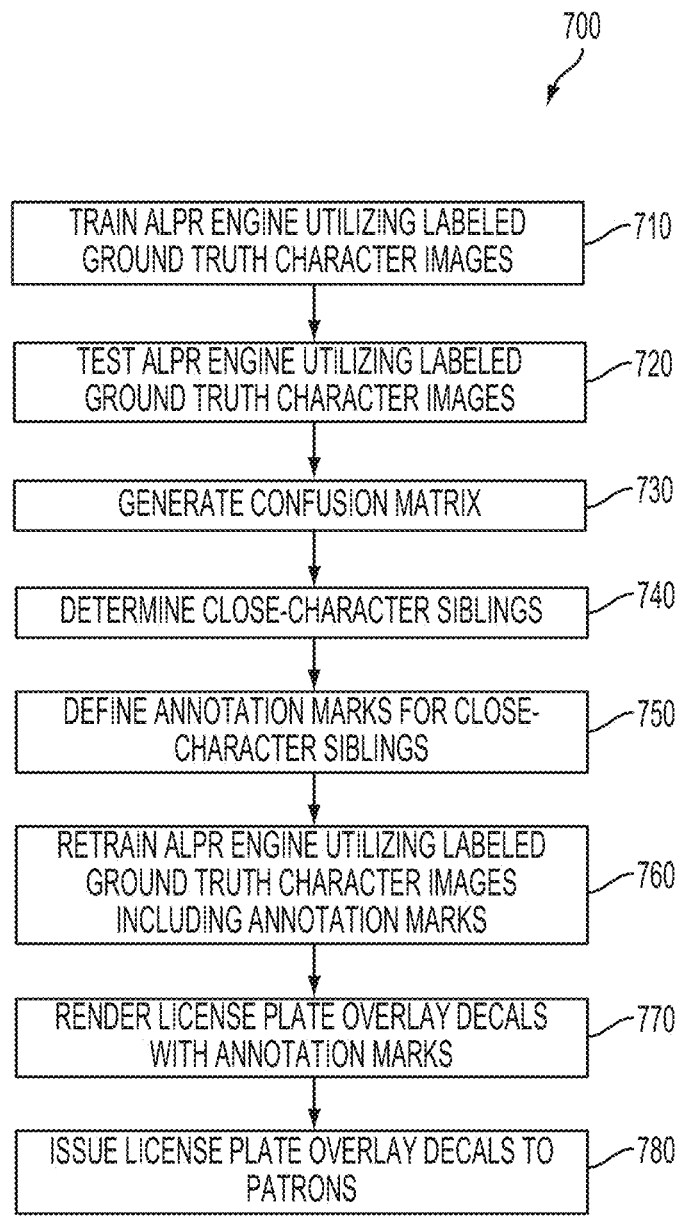
FIG. 10 illustrates a high level flow chart of operations illustrating logical operational steps of a method for providing the annotation marks for an actual tolling image, in accordance with the disclosed embodiments.

FIG. 10 illustrates a high level flow chart of operations illustrating logical operational steps of a method 700 for providing annotation marks 370 for actual tolling images, in accordance with the disclosed embodiments. Note that the annotation marks 370 can simply be a table of additional line strokes depending on the character, or depending on the two close-character siblings 385. The ALPR engine 335 can be trained utilizing labeled ground truth character images 355, as shown at block 710. The ALPR engine 335 can be tested utilizing the labeled ground truth character images 355, as described at block 720.

The confusion matrix 345 can be generated, as mentioned at block 730. The close-character siblings 385 can be determined, as depicted at block 740. The annotation marks 370 can be defined for the close-character siblings 385, as indicated at block 750. The ALPR engine 335 can be retrained utilizing labeled ground truth character images 355 including the annotation marks 370, as shown at block 760. The license plate overlay decals can be rendered with the annotation marks 370, as mentioned at block 770 and the license plate overlay decals can be issued to patrons, as described at block 780.

Figure 11:
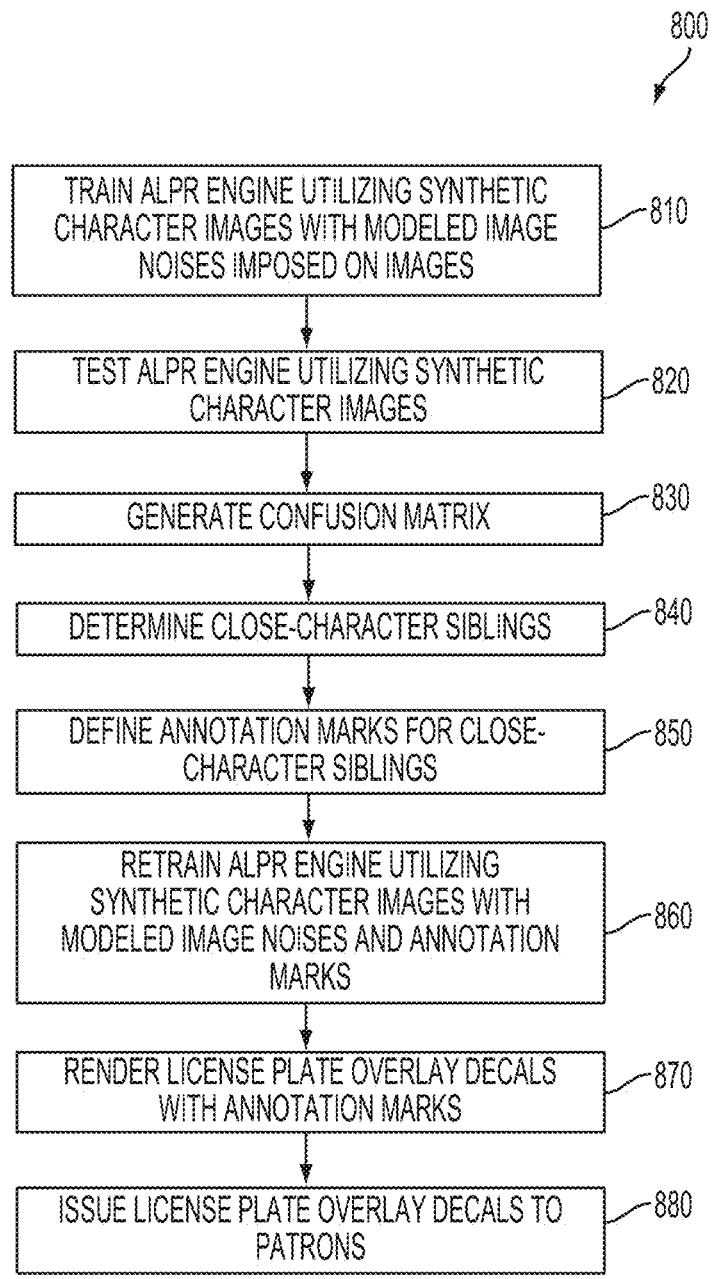
FIG. 11 illustrates a high level flow chart of operations illustrating logical operational steps of a method for providing the annotation marks for a synthetic plate image, in accordance with the disclosed embodiments.

FIG. 11 illustrates a high level flow chart of operations illustrating logical operational steps of a method 800 for providing the annotation marks 370 for synthetic plate images with appropriate modeled noises 360 imposed on the plate images, in accordance with the disclosed embodiments. The synthetic plate images 360 can be employed for new applications or even for new plate design with new fonts. The synthetic plate images 360 can be employed for plate characters that are rendered from the actual font. The ALPR engine 335 can be trained utilizing synthetic character images with modeled image noises 360 imposed on the images, as shown at block 810.

The ALPR engine 335 can be tested utilizing synthetic character images 360, as described at block 820. The confusion matrix 345 can be generated, as mentioned at block 830. The close-character siblings 385 can be determined, as depicted at block 840. The annotation marks 370 can be defined for the close-character siblings 385, as indicated at block 850. The ALPR engine 335 can be retrained utilizing synthetic character images 360 with modeled image noises and the annotation marks 370, as shown at block 860. The license plate overlay decals can be rendered with the annotation marks 370, as mentioned at block 870 and the license plate overlay decals can be issued to patrons, as described at block 880.

Figure 12:
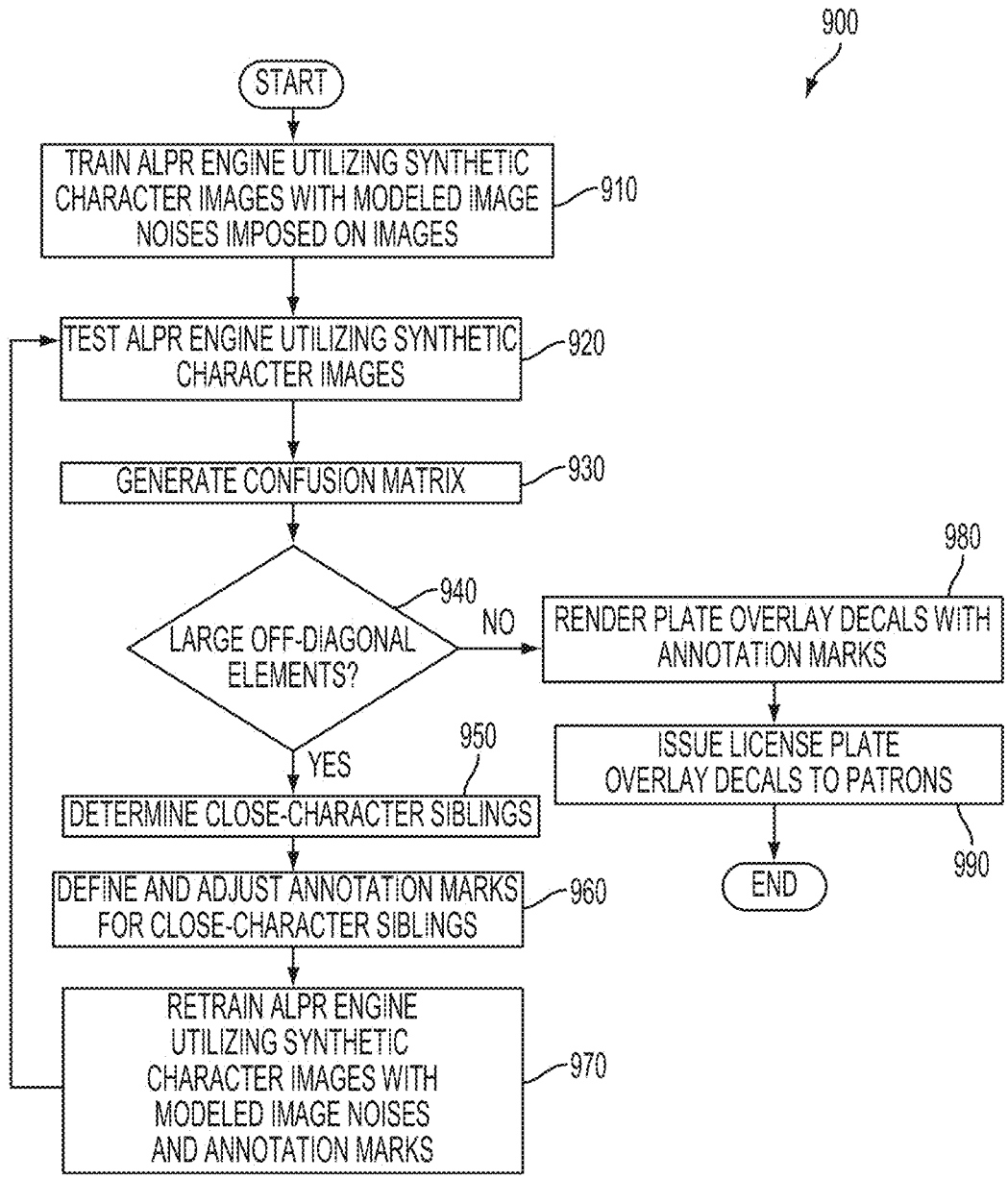
FIG. 12 illustrates a high level flow chart of operations illustrating logical operational steps of a method for improving accuracy of an ALPR system utilizing the augmented IR readable annotation marks, in accordance with the disclosed embodiments.

FIG. 12 illustrates a high level flow chart of operations illustrating logical operational steps of a method 900 for improving accuracy of an ALPR system utilizing the augmented IR readable annotation marks 370, in accordance with the disclosed embodiments. The synthetic plate generation and synthetic noise generation process can be iterated to optimize the additional IR readable strokes resulting in a system with very low off-diagonal terms in the confusion matrix 345 and highly accurate ALPR performance with respect to characters that can be confused with each other. The ALPR engine 335 can be trained utilizing synthetic character images with modeled image noises 360 imposed on the images, as mentioned at block 910. The ALPR engine 335 can be tested utilizing synthetic character images 360, as described at block 920. The confusion matrix 345 can be generated, as mentioned at block 930.

A determination can be made whether the off-diagonal elements are large, as described at block 940. The close-character siblings 385 can be determined if there exists large off-diagonal elements, as depicted at block 950. Thereafter, the annotation marks 370 can be defined and adjusted for the close-character siblings 385, as indicated at block 960. The ALPR engine 335 can be retrained utilizing the synthetic character images with modeled image noises 360 and the annotation marks 370, as shown at block 970 and the ALPR engine 335 can be tested utilizing the synthetic character images 360, as described at block 920.

If off-diagonal elements are small, the license plate overlay decals can be rendered with the annotation marks 370, as mentioned at block 980. The license plate overlay decals can be issued to patrons, as described at block 990. The system 300 can be employed for license plate design and printing and to define the overlay decal that is attached to an already printed license plate that is in the possession of a patron, for example. Note that the annotation marks 370 can be employed with license plate fonts of any language.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A method for designing a license plate overlay decal, said method comprising:
   providing an infrared readable annotation mark with respect to a character image associated with a license plate via training of an automatic license plate recognition engine to improve automatic license plate recognition performance; and
   rendering a plate overlay decal with said infrared readable annotation mark wherein said infrared readable annotation mark is visible when illuminated by infrared light and said license plate appears normal in visible light.

2. The method of claim 1 further comprising attaching said plate overlay decal with said infrared readable annotation mark to said license plate.

3. The method of claim 1 further comprising directly placing said plate overlay decal with said infrared readable annotation mark on said license plate when said license plate is rendered.

4. The method of claim 1 further comprising:
   training and testing said automatic license plate recognition engine utilizing said character image and thereafter generate a confusion matrix in order to determine a close character sibling;
   defining said infrared readable annotation mark with respect to said close-character sibling and retraining said automatic license plate recognition engine utilizing said character image including said infrared readable annotation mark; and
   enhancing accuracy of said automatic license plate recognition engine by said infrared readable annotation mark so that said infrared readable annotation mark fits in an automatic license plate recognition training paradigm without special processing at run time.

5. The method of claim 1 wherein said character image comprises at least one of the following types of character images:
a labeled ground truth character image; and/or
a synthetic character image with modeled image noise imposed on said image.

6. The method of claim 1 further comprising:
iterating a synthetic plate generation and synthetic noise generation process to optimize said infrared readable annotation mark resulting in a low off-diagonal term in said confusion matrix; and
achieving a high level of automatic license plate recognition performance utilizing said synthetic character image with said modeled image noise.

7. The method of claim 1 wherein said infrared readable annotation mark enables an optical character recognition module to differentiate said close character sibling under a poor imaging condition.

8. The method of claim 1 further comprising determining a boundary of said license plate character and a cut point utilizing said infrared readable annotation mark such that each character is coherently cropped out of said license plate image to improve character segmentation accuracy.

9. The method of claim 1 further comprising clearly identifying a logo on said license plate utilizing said infrared readable annotation mark to significantly improve said character segmentation accuracy.

10. The method of claim 1 further comprising:
determining a presence of said overlay decal based on presence of said infrared readable annotation mark; and
issuing a warning by an electronic tolling system upon entry and/or exit of a toll roadway if a user has not attached said overlay decal.

11. A system for designing a license plate overlay decal, said system comprising:
a processor;
a data bus coupled to said processor; and
a computer-usable medium embodying computer program code, said computer-usable medium being coupled to said data bus, said computer program code comprising instructions executable by said processor and configured for:
providing an infrared readable annotation mark with respect to a character image associated with a license plate via training of an automatic license plate recognition engine to improve automatic license plate recognition performance; and
rendering a plate overlay decal with said infrared readable annotation mark wherein said infrared readable annotation mark is visible when illuminated by infrared light and said license plate appears normal in visible light.

12. The system of claim 11 wherein said instructions are further configured for attaching said plate overlay decal with said infrared readable annotation mark to said license plate.

13. The system of claim 11 wherein said plate overlay decal is directly placed with said infrared readable annotation mark on said license plate when said license plate is rendered.

14. The system of claim 11 wherein said instructions are further configured for:
training and testing said automatic license plate recognition engine utilizing said character image and thereafter generate a confusion matrix in order to determine a close character sibling;
defining said infrared readable annotation mark with respect to said close-character sibling and retraining said automatic license plate recognition engine utilizing said character image including said infrared readable annotation mark; and
enhancing accuracy of said automatic license plate recognition engine by said infrared readable annotation mark so that said infrared readable annotation mark fits in an automatic license plate recognition training paradigm without special processing at run time.

15. The system of claim 11 wherein said character image comprises at least one of the following types of character images:
a labeled ground truth character image; and/or
a synthetic character image with modeled image noise imposed on said image.

16. The system of claim 11 wherein said instructions are further configured for:
iterating a synthetic plate generation and synthetic noise generation process to optimize said infrared readable annotation mark resulting in a low off-diagonal term in said confusion matrix; and
achieving a high level of automatic license plate recognition performance utilizing said synthetic character image with said modeled image noise.

17. The system of claim 11 wherein said infrared readable annotation mark enables an optical character recognition module to differentiate said close character sibling under a poor imaging condition.

18. The system of claim 11 wherein said instructions are further configured for determining a boundary of said license plate character and a cut point utilizing said infrared readable annotation mark such that each character is coherently cropped out of said license plate image to improve character segmentation accuracy.

19. A processor-readable medium storing computer code representing instructions to cause a process for designing a license plate overlay decal, said computer code further comprising code to:
provide an infrared readable annotation mark with respect to a character image associated with a license plate via training of an automatic license plate recognition engine to improve automatic license plate recognition performance; and
render a plate overlay decal with said infrared readable annotation mark wherein said infrared readable annotation mark is visible when illuminated by infrared light and said license plate appears normal in visible light.

20. The processor-readable medium of claim 19 wherein said code further comprises code to:
train and test said automatic license plate recognition engine utilizing said character image and thereafter generate a confusion matrix in order to determine a close define sibling;
defining said infrared readable annotation mark with respect to said close-character sibling and retraining said automatic license plate recognition engine utilizing said character image including said infrared readable annotation mark; and
enhance accuracy of said automatic license plate recognition engine by said infrared readable annotation mark so that said infrared readable annotation mark fits in an automatic license plate recognition training paradigm without special processing at run time.

* * * * *